United States Patent [19]

Mao et al.

[11] 4,329,408
[45] May 11, 1982

[54] LEAD OXIDE COMPOSITION FOR USE IN LEAD-ACID BATTERIES

[75] Inventors: George W. Mao, St. Paul; Purushothama Rao, Eagan; Frederick L. Marsh, Fridley; Francis M. Dunlevey, Apple Valley, all of Minn.

[73] Assignee: Gould Inc., Rolling Meadows, Ill.

[21] Appl. No.: 155,251

[22] Filed: Jun. 2, 1980

[51] Int. Cl.³ .................... H01M 4/20; H01M 4/57
[52] U.S. Cl. ................................ 429/228; 252/182.1
[58] Field of Search ................... 429/226, 228; 252/182.1; 204/2.1

[56] References Cited

U.S. PATENT DOCUMENTS

| | | | |
|---|---|---|---|
| 1,788,571 | 1/1931 | Gardiner et al. | 429/228 |
| 2,791,619 | 5/1957 | Clostermann et al. | 136/65 |
| 3,723,182 | 3/1973 | Venuto | 136/26 |
| 3,765,943 | 10/1973 | Biagetti | 136/27 |
| 3,788,898 | 1/1974 | Yarnell | 204/2.1 |
| 3,809,579 | 5/1974 | Venuto | 136/26 |
| 3,926,670 | 12/1975 | Taylor et al. | 136/26 |
| 3,933,524 | 1/1976 | Hughel et al. | 136/64 |
| 3,969,141 | 7/1976 | Eriksson | 252/182.1 |

FOREIGN PATENT DOCUMENTS

| | | |
|---|---|---|
| 1117884 | 11/1961 | Fed. Rep. of Germany . |
| 1283034 | 12/1962 | France . |
| 260472 | 11/1926 | United Kingdom . |
| 1156527 | 6/1969 | United Kingdom . |
| 1329974 | 9/1973 | United Kingdom . |
| 1331257 | 9/1973 | United Kingdom . |
| 1344963 | 1/1974 | United Kingdom . |
| 1346913 | 2/1974 | United Kingdom . |
| 1396308 | 6/1975 | United Kingdom . |
| 2020479 | 11/1979 | United Kingdom . |

OTHER PUBLICATIONS

Vinal, Storage Batteries, Fourth Edition, p. 23, John Wiley and Sons, Inc., 1955.
I. Korov and D. Denev, "Investigation of the Possibilities for Increasing the Copper Content of (Lead) Battery Alloys," *Metalurgiya* (Bulgaria), 1972, 27, (5), 22–25.
Burbank, *J. Electrochem. Soc.*, The Role of Antimony in Positive Plate Behavior in the Lead–Acid Cell, vol. 111, No. 10, p. 1112, (Oct. 1964).
Chemical Abstract Reference to Palanichamy, *J. Electrochem. Soc. India*, Improvement of Low Temperature Performance of Lead-Acid Batteries, p. 103–9 (1970).

*Primary Examiner*—Donald L. Walton
*Attorney, Agent, or Firm*—Augustus J. Hipp

[57] ABSTRACT

A lead oxide for use in making an active material for pasted lead-acid battery plates comprises a doped lead oxide, the dopant preferably being copper in an amount of about 0.01 to about 0.07 percent based upon the total weight of the lead oxide. The use of such a doped oxide imparts to the resulting battery improvement in various of the electrical performance characteristics such as, for example, internal resistance, capacity, cycle life and the like.

3 Claims, 3 Drawing Figures

LEAD OXIDE COMPOSITION FOR USE IN LEAD-ACID BATTERIES

This invention relates to lead-acid storage batteries and, more particularly, to lead oxide compositions for use therein.

From a theoretical viewpoint, the reaction which occurs at the positive plate in a lead-acid battery shows that every gram of lead dioxide should yield 0.224 ampere hour of useful electricity. However, as is also well known, in actual practice only 30–50% of this capacity is realized in conventional lead-acid batteries. This relatively low efficiency remains the conventional practice despite considerable efforts to provide commercially viable ways of achieving higher efficiencies.

Likewise, the concept of doping lead oxide with particular materials to improve certain operating characteristics of lead-acid batteries has been suggested. For example, U.S. Pat. No. 3,723,182 to Venuto discloses the addition of minor amounts of a uniformly dispersed quantity of antimony throughout the lead peroxide active material. The antimony is believed bound in a molecular array with the lead and oxygen. Batteries built with positive electrodes using such active material were shown to be free of the defects usually associated with batteries using non-antimony lead grids including the ability to accept charge at any stage of discharge, improved capacity and cycle life equal to that of batteries having antimonial lead grids.

It is likewise known that certain impurities may also have deleterious effects on the characteristics of lead-acid batteries. For this reason, the purity of the lead-oxide and sulfuric acid used in the preparation of lead sulfate paste is of particular importance since such impurities are likely to contaminate the electrolyte or active part of the battery electrode. Accordingly, impurities such as silver, copper, aluminum, iron, zinc, manganese and others which are believed to have a deleterious effect on the electrical performance of electrochemical cells are commonly carefully controlled. As an example, U.S. Pat. No. 3,788,898 to Yarnell states that such impurities should not be present in quantities greater than 0.3 mole percent.

However, some investigators have examined the possibility of increasing the copper content in alloys used for forming grids for use in lead-acid batteries. Thus, Korov and Denev, in Metalurgiya (Bulgaria) 1972, 27, (5), 22–25, "Investigation of the Possibilities for Increasing the Copper Content of (lead) Battery Alloys", concluded that adding copper within a certain range to pre-eutectic lead-antimony alloys has a positive effect both on the physical and mechanical properties of the alloys, as well as on their hardness and castability. The authors further note that the significant improvement in the mechanical properties of the battery grid made using such alloys means increased stability of the battery in heavy duty applications while the reduced rate of corrosion increases the life of the battery. Still further, U.S. Pat. No. 2,791,619 and German Pat. No. 1,117,884 suggest the inclusion of 0.05–0.12 and 0.04–0.12 percent copper by weight, respectively, in the grid alloy while French Pat. No. 1,283,034 suggests plating the positive grid with copper.

Various studies have likewise speculated that the active material in a lead-acid battery becomes doped by the transport of an element or elements from the grid into the oxide active material and that this can affect the performance characteristics of the battery. In particular, Burbank, *J. Electrochem. Soc.*, Vol. 111, No. 10, page 1112, October, 1964, concludes that the presence of antimony in the positive grid exerts the direct and beneficial influence of causing prismatic $PbO_2$ formation in the active material and consequently aids in the retention of a firm paste texture and cell capacity in shallow cycle tests.

It is accordingly an object of the present invention to provide a novel lead oxide capable of imparting improved performance characteristics to lead-acid batteries having active material made from such an oxide.

A related and more specific object provides a lead oxide capable of achieving increased efficiency of oxide utilization in a lead-acid battery using such an oxide.

Yet another object lies in the provision of a novel oxide capable of increasing, in a lead-acid battery using such an oxide, the electrical conductivity of the system so as to provide lower internal resistance and thus higher power output.

Another object of the present invention is to provide a lead oxide capable of imparting improved cycle life to lead-acid batteries using such an oxide.

A further object is to provide a lead oxide which can be readily made by techniques commonly used for making conventional lead oxides.

Other objects and advantages of the present invention will become apparent from the following description and from the drawings in which.

Figure 1:
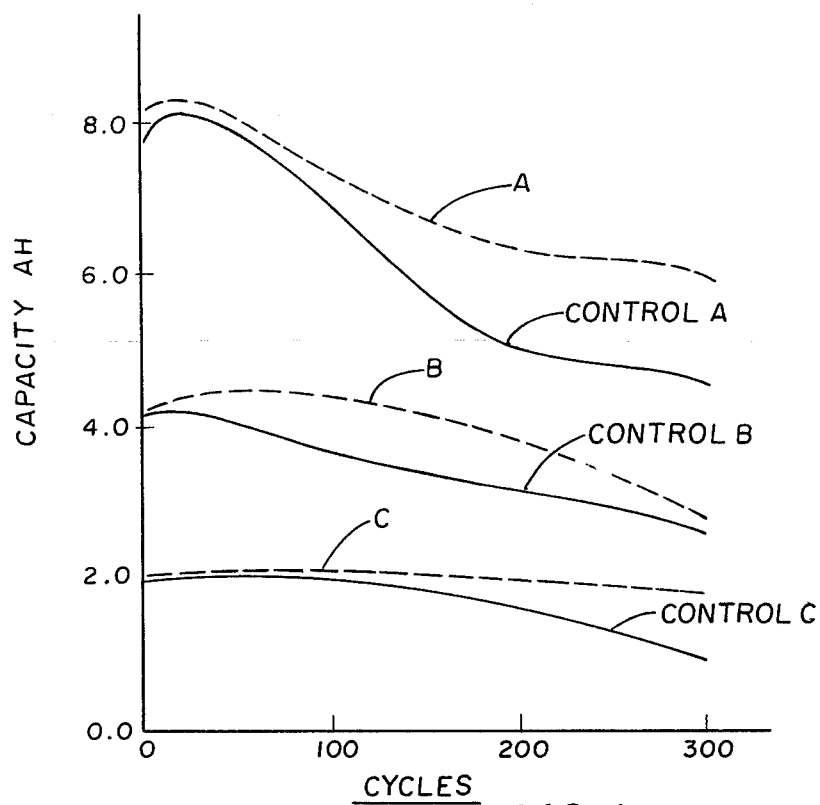
FIG. 1 is a graph of capacity versus number of cycles and showing at three different discharge rates the performance of test cells incorporating the oxide made in accordance with the present invention as compared with the performance of control cells prepared using conventional oxides.

While the invention is susceptible to various modifications and alternative forms, there is shown in the drawings and will herein be described in detail, the perferred embodiments. It is to be understood, however, that it is not intended to limit the invention to the specific forms disclosed. On the contrary, it is intended to cover all modifications and alternative forms falling within the spirit and scope of the invention as expressed in the appended claims.

In general, the present invention is predicated on the discovery that the performance of lead-acid batteries can be improved by utilizing a lead oxide incorporating a minor amount of copper. Such lead oxides have been found to impart to lead-acid batteries using such oxides higher oxide utilization, greater conductivity and longer cycle life. The amount incorporated should desirably not be in significant excess of the maximum amount of copper in the copper-lead eutectic. Accordingly, it is preferred to utilize no more than about 0.06 or perhaps 0.07 percent by weight copper, based upon the total weight of the lead oxide. On the other hand, as a minimum, it is believed desirable to have copper present in an amount of at least 0.01 percent by weight. Certainly, a sufficient amount of copper should be utilized to allow achievement of the desired improvement in the performance characteristics of the battery.

It is believed that the copper should be introduced in a fashion such that it functions as what may be termed a cation dopant for the lead oxide, entering into the Pb-O lattice and displacing some of the lead atoms. Alternatively, it may be that the copper atoms are filling the interstitial voids in the lead oxide material. At any rate, it is believed that the resulting lead oxide material is other than a simple physical admixture since repeated cycling of batteries using such lead oxides did not show the presence of copper sulfate, as would be expected in the event leaching or segregation of the copper from a physical admixture should occur in the electrolyte. Accordingly, the terminology "copper doped-lead oxide" will be used hereinafter to describe the novel oxide of the present invention to distinguish from mere physical admixtures.

The copper doped-lead oxide of the present invention may be prepared by any of the techniques known for making lead oxides which may be used in lead-acid battery applications. The particular technique should, of course, be modified to insure that a doped oxide rather than a physical admixture will result. For example, the use of a Barton pot is commonly used commercially to form lead oxides for lead-acid battery applications. The technique is quite economical and provides oxides with satisfactory properties, viz.—leady oxides with about 20–25 percent by weight lead metal. In this technique, a draft of air is forced down upon the surface of a continuous stream of molten lead droplets, forming lead oxides. As the lead oxides form, they are continuously drawn off. The typical product from this process has a high degree of oxidation, i.e.—leady oxide, and is in the form of a very fine powder. The doped oxide of the present invention may be made using this technique by feeding a lead-copper alloy into the Barton pot, and this is the preferred technique.

Other techniques are however known and may likewise be used for making the doped oxide of the present invention, if desired. As one example, a ball mill is used in which pieces of lead are ground against each other in the presence of air to produce an oxide having a high content, generally, of unoxidized lead. To form the doped oxide of this invention, copper can be alloyed with lead and then introduced into the ball mill. A further example of a useful process is chemical co-precipitation.

The particular process used to form the doped oxide of the present invention will depend upon, in part, the type of lead oxide desired for the particular type of application as well as, of course, the economics of the situation. However, regardless of which method is used, it should be appreciated that the level of impurities present in the lead or other materials used in preparing the oxide should be sufficiently low to insure that the function of the copper in the doped oxide is not significantly adversely effected. It is believed that this can be suitably achieved by insuring that any impurities present are in amounts on the order of those found in typical commercially available raw materials used in making lead oxides for electrochemical applications, such as, for example, refined lead.

The doped oxide of the present invention may then be formed into a paste and the plates pasted, cured and formed. Suitable techniques for each of these steps are well known in the art and may be used. The particular techniques do not form a part of this invention. Likewise, the construction of the battery and the various components may be any of the myriad which are known. The particular battery construction thus does not form a part of the invention.

It is preferred to utilize copper as a doping agent due to the demonstrated advantages which can be derived. However, it is believed that other elements, such as lithium, bismuth, barium, phosphorous, silver, aluminum and calcium should have similar doping effects and may be substituted for the copper, if desired. If used, the amount should not be in significant excess of the dopant-lead rich eutectic.

The following examples are illustrative but not in limitation of the present invention. Unless otherwise indicated, all percentages are by weight.

EXAMPLE 1

This Example illustrates the preparation of copper doped-lead oxide made in accordance with the present invention by a chemical precipitation technique. The performance of test cells using active material formed from such oxide is compared with that of control cells.

742.5 grams of $Pb(NO_3)_2$ were dissolved in three liters of distilled water. Copper nitrate, 0.951 grams of $Cu(NO_3)_2.6H_2O$, were added. 280 grams of sodium hydroxide were dissolved in 500 ml. of water, and the two solutions were added together and mixed rapidly for about ½ hour. The solutions were allowed to stand for an additional ½ hour, and the excess liquid was poured off. This was filtered through a fine porosity fritted glass filter. 50 grams KOH were then dissolved in 100 ml. of distilled water which was heated and stirred to 80° C. in a one liter beaker. The solids from the funnel were added to the hot caustic with stirring and heating for about 20 minutes, which was about five minutes more than needed for the color to change to red. This was then filtered and washed with distilled water, and the product was dried in an oven overnight at 110° C. The material was then ground and stored in air-tight bottles. By calculation, the doped lead oxide contained about 0.043 percent copper by weight.

A positive paste for grids ($3'' \times 4'' \times 0.13''$ dimensions) were prepared from the doped oxide material utilizing a standard paste formulation. The pasted test plates were given a 72-hour formation and were tested for electrical performances against similar control cells, except that copper-free precipitated lead oxide was used to form the paste.

Prior to introduction of the test cells into a regular cycle regime, these cells were given stand tests through the first four discharges. The stand loss involved over a twenty week stand was considered tolerable in view of the expected performance of cells made using conventional lead oxide.

The cells were then subjected to extended cycling tests in a regular cycle regime, the regime involving one cycle per day and the charge back being to a 20% excess of the discharged capacity. The performance of the test cells was compared to control cells under various discharge rates.

The results are presented in graph form in FIG. 1. Test Cell A and Control Cell A were discharged at a rate of 0.75 amps to a voltage cut-off of 1.75 volts. Test Cell B and Control Cell B were discharged at a 5.0 amp rate to a cut-off of 1.6 volts. Test Cell C and Control Cell C were discharged at a 50.0 amp rate to a cut-off of 1.2 volts.

As can be seen, the test cells utilizing the doped oxide of the present invention resulted in improvement in the battery performance, achieving higher capacity.

EXAMPLE 2

This Example provides performance data with batteries using the doped oxide obtained with a ball mill technique.

A lead alloy containing about 0.07% by weight copper was cast into ¾ inch balls. These balls were introduced into a milling vessel chamber and were milled under a time-temperature program until the leady oxide particles were reduced in size to a typical battery oxide range.

The surface area of the doped oxide was 1.20 square meters/gram as compared with 1.09 for the oxide of the control cell. The doped oxide, by analysis, contained 25.5% lead metal in comparison with 19.0% lead metal for the lead oxide of the control cell.

Grids were pasted using a standard paste formulation, were cured in an ambient temperature and humidity regime and then were subjected to a twenty hour formation. Cells were built and tested.

In the test cells containing the copper-doped oxide of the present invention, there was little evidence of appreciable copper specie in the solution of the cycled cells. Indeed, the intense blue color of the copper specie did not appear, even after the solution was made basic with an excess of ammonia, viz.—the conventional test for detection of copper proved negative.

The results of the electrical performance data are set forth in Table I hereinafter:

TABLE I

| Cell Type | | Resistance (mΩ) at 75° F. | End of Charge Ref. Electrode | | at 0.75 Amps Cell Voltage (Volts) | Ampere-Hour Capacity During Discharge Cycle | | |
|---|---|---|---|---|---|---|---|---|
| | | | Pos. Plate | Neg. Plates | | 1st | 2nd | 3rd |
| Cu | pos. only[1] | 7.1 ± 0.4 | 1.24 | −1.43 | 2.67 | 9.12 | 9.90 | 10.17 |
| | pos. + neg.[2] | 7.0 ± 0.4 | 1.22 | −1.43 | 2.65 | 9.17 | 9.75 | 10.22 |
| Control | pos. w/conventional neg.[3] | 7.5 ± 0.6 | 1.07 | −1.30 | 2.38 | 8.05 | 8.72 | 8.37 |
| | pos. + neg. | 7.8 ± 0.3 | 1.09 | −1.31 | 2.41 | 8.56 | 9.49 | 9.90 |

[1] The doped oxide was used in forming only the positive active material.
[2] The doped oxide was used in forming the active material for both positive and negative plates.
[3] The conventional negative was made with a Barton pot oxide. The other pastes were made from lead oxides obtained via the ball mill technique.

Each value set forth in the table is the average of the data of four test and four control cells, except for the initial control cell where three cells were used. The resistance values represent the average value of the four cells after the cells were fully charged at the end of the third cycle. Also, the end of charge potential and cell voltage values were taken when the cells were fully charged at 0.50 amperes after the three initial cycles were completed.

As can be seen, the values of the internal resistance of the test cells including the doped oxide of the present invention was lower than the values of the control cells, resulting in initial high capacity for the test cells.

EXAMPLE 3

This Example illustrates further performance data for test cells containing the copper-doped oxide of the present invention.

Doped oxide, made in accordance with the technique described in Example 2, was made into a paste using a standard formulation. The paste was cured at ambient temperature for 72 hours. The cured paste was used in conjunction with grids of 0.13 inch thickness made from a 4.5 percent by weight antimony-lead alloy. The pasted positive and negative plates were formed using a conventional twenty hour formation.

Table II provides a summary of the performance:

TABLE II

| Type | Number of Cells | Capacity Cycle Life (0.75A Rate) at Cycle No. (Ah): | | | | | | | Cycles to End of Life[c] |
|---|---|---|---|---|---|---|---|---|---|
| | | 1 | 3 | 10 | 20 | 40 | 50 | 100 | |
| Control | 3 | 8.1 | 9.2 | 9.1 | 8.2 | 7.1 | 6.0 | 5.3 | 103 |
| 0.07% Cu[a] | 3 | 9.2 | 10.0 | 9.7 | 8.7 | 7.9 | 6.6 | 4.9 | 98 |
| 0.07% Cu[b] | 3 | 9.1 | 10.1 | 9.8 | 8.8 | 8.0 | 7.0 | 5.0 | 100 |

[a] Dopant in positive plate only
[b] Dopant in both positive and negative plates
[c] End of Cycle Life is 5.0 Ah at 0.75A.

The test cells using the copper-containing plates provided improved electrical performances over that of the control cells.

EXAMPLE 4

This Example sets forth performance data relative to extended cycle studies of test cells containing the copper-doped oxide of the present invention obtained via the process described in Example 2.

Three-plate cells were constructed. The sets were prepared on thin grids of 0.075" thickness, containing a matching quantity of active material as used with the 0.13 inch thick cell plates utilized in Example 3. The changes in plate material and electrical properties during cycling are exaggerated on the thin plates when correlated to the thick plates.

Figure 2:
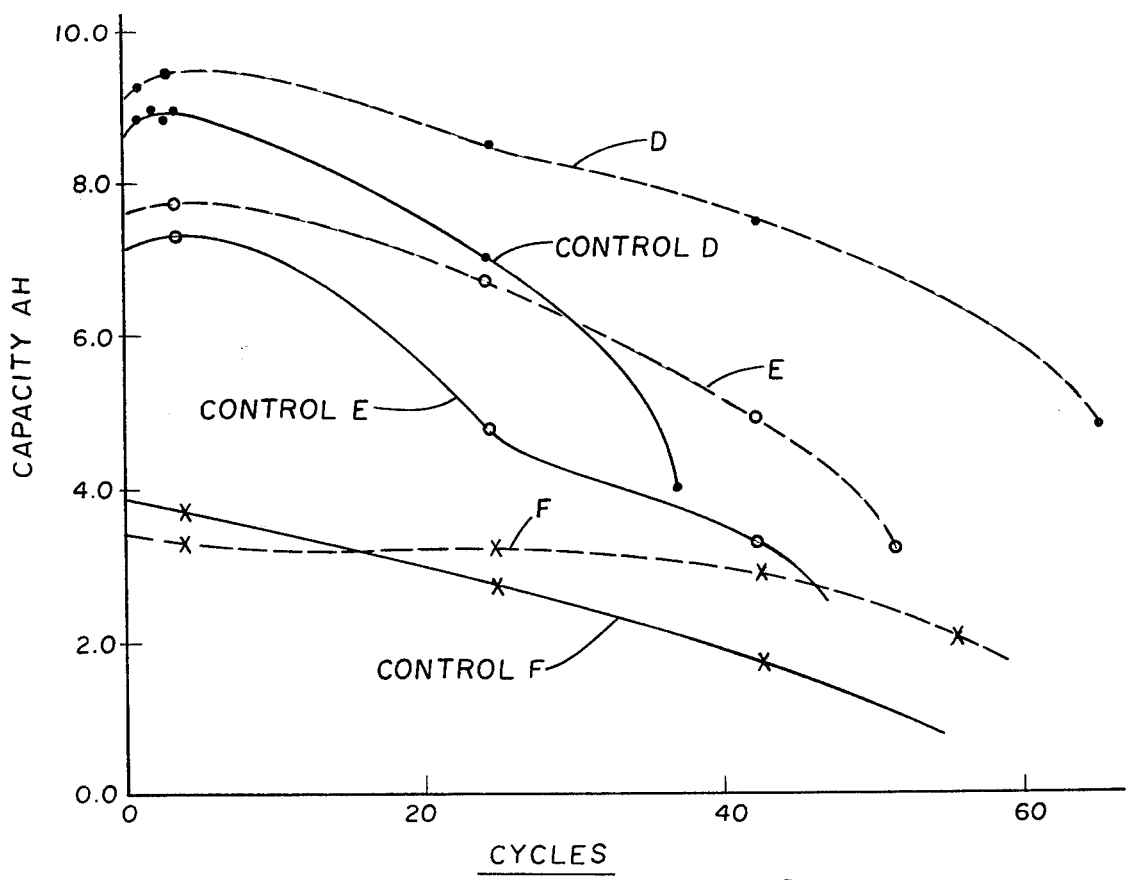
FIG. 2 is a graph similar to FIG. 1 and showing a comparison of additional test cells made in accordance with the present invention versus certain control cells, each made with much thinner grids than the cells whose performance is depicted in FIG. 1.

FIG. 2 sets forth the capacity versus cycle curve for the various cells tested. Test Cells D and the corresponding control cell were discharged at a rate of 0.75 amps; Test Cell E and the control cells were discharged at a rate of 5.0 Amps; Test Cells F and the corresponding control cells were discharged at a rate of 50.0 Amps. The data set forth was obtained from cycling five control cells and five test cells using the subject invention.

The test cells utilizing the present invention gave 5-12% increases in initial capacity as well as 7-12% increases in the maximum capacity. Scanning electron microphotographs of the active formed materials of the positive plates of both a control cell and the test cell using the doped oxide of the present invention were made. It was observed that the copper-doped lead oxide material from the test cell had smaller particles and that the polycrystalline mass contained many macroscopic pores which leaves the bulk of the material open for rapid electrolyte transport. Similar observations were also found in active material of plates from the test and control cells which had been cycled 24 times. This is believed to provide some indication that the copper affects and enters the lead-oxygen lattice in some fashion.

EXAMPLE 5

This Example illustrates the performance of further test cells made using the doped oxide of the present invention.

The doped oxide tested was made using the ball mill technique set forth in Example 2, and plates for test and control cells were pasted using a conventional formula on grids having a thickness of 0.075" as described in Example 4. A twenty hour standard formation was used.

The results are set forth in Table III hereinafter:

TABLE III

| No. of Cells | Type | Grid | Cure | Capacity-Cycle Life (0.75 A) | | | | |
|---|---|---|---|---|---|---|---|---|
| | | | | 1 | 3 | 10 | 20 | 40 |
| 5 | 0.07% Cu | Sb | 75 hr ambient temp | 9.1 | 9.5 | 9.4 | 8.7 | 7.7 |
| 6 | Control | Sb | 72 hr ambient temp | 8.7 | 8.9 | 8.7 | 7.6 | 3.8 |
| 2 | 0.07% Cu | 0.05% Ca | Humidity, 100% RH 140° F., 8 hours | 6.1 | 7.1 | 7.3 | 5.0 | — |
| 2 | Control | 0.05% Ca | Humidity, 100% RH 140° F., 8 hours | 6.8 | 7.7 | 7.9 | 7.0 | 4.1 |

Figure 3:
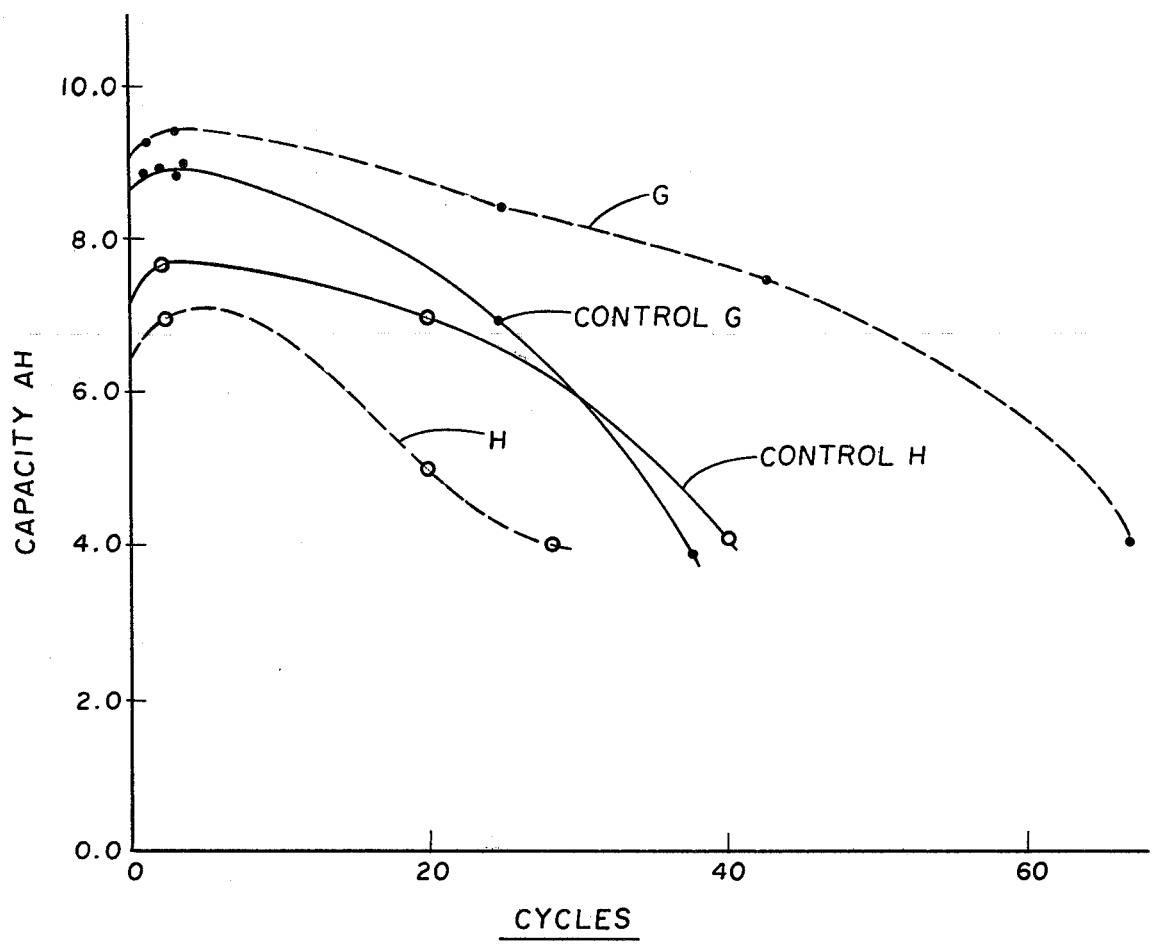
FIG. 3 is yet another graph similar to FIG. 1 and showing other comparative performance data.

The results are also shown in FIG. 3. The data was obtained by a discharge regime with a discharge rate of 0.75 Amps.

As can be seen, when compared to a control cell using a 4.5 percent antimony-lead grid, the test cells of the present invention were significantly better. However, in test cells using 0.05% calcium-lead grids, the control cells were better.

It is believed that the use of the present invention at least minimizes any effect of the grid composition, perhaps even making the performance of the cell independent of the composition of the grid structure. It is therefore believed that the invention is fully usable and will find advantageous results, regardless of the grid alloy composition.

Thus, as has been seen, the present invention provides active material for lead-acid batteries which offers distinct advantages. The doped oxide of the present invention can thus be readily made into active material and impart to the resulting battery the potential for significant improvement in various of the electrical performance characteristics of the battery such as, for example, internal resistance, capacity, cycle life and the like.

We claim:

1. A lead oxide for use in the manufacture of storage battery plates having grids of other than a calcium-lead alloy which comprises a mixture consisting of lead oxide and copper, the copper being present as a dopant for the lead oxide in an amount of from about 0.01 to about 0.07 percent based upon the total weight of said lead oxide.

2. A method for improving the capacity of a lead-acid storage battery having a plurality of lead oxide-pasted plates having grids of other than a calcium-lead alloy which comprises doping the lead oxide used for making at least some of the pasted plates with copper in an amount from about 0.01 to about 0.07 percent based upon the total weight of said lead oxide.

3. In a lead-acid storage battery having a plurality of lead oxide-pasted plates having grids of other than a calcium-lead alloy, the improvement comprising at least some of said plates being formed from lead oxide doped with from about 0.01 to about 0.07 percent copper based upon the total weight of said lead oxide.

* * * * *